United States Patent [19]

Pryor, Jr.

[11] 4,205,396
[45] May 27, 1980

[54] AUTOMATIC DIFAR CARDIOID FORMER

[75] Inventor: Cabell N. Pryor, Jr., Silver Spring, Md.

[73] Assignee: United States of America as represented by the Secretary of the Navy, Washington, D.C.

[21] Appl. No.: 565,291

[22] Filed: Mar. 25, 1975

[51] Int. Cl.² .............................................. G01S 3/80
[52] U.S. Cl. .................................... 367/125; 367/126; 367/901
[58] Field of Search ............. 340/6 R, 16 R; 343/119; 367/125, 126, 135, 901

[56] References Cited

U.S. PATENT DOCUMENTS

| 3,369,235 | 2/1968 | Odams et al. | 343/119 |
| 3,710,332 | 1/1973 | Tischner et al. | 343/119 |
| 3,860,928 | 1/1975 | Ehrlich | 367/126 X |

Primary Examiner—Richard A. Farley
Attorney, Agent, or Firm—R. S. Sciascia; Sol Sheinbein

[57] ABSTRACT

An automatic method for forming a generalized cardioid pattern from the three hydrophone signals of the DIFAR system to remove bearing bias and produce a minimum noise signal channel to substitute for the omnidirectional signal as a reference.

2 Claims, 5 Drawing Figures

AUTOMATIC DIFAR CARDIOID FORMER

BACKGROUND OF THE INVENTION

The DIFAR (Directional Frequency Analysis and Recording) directional passive sonobuoy system employs three co-located hydrophones for bearing determination. Two are gradient, or velocity, sensors having cosine or "figure 8" patterns oriented so that one has a maximum sensitivity along the north-south axis, and the other along the east-west axis. The third hydrophone is omnidirectional and is used as a phase reference. Processing is done in each of many narrow frequency bands by multiplying each of the directional (or dipole) hydrophone outputs by the omnidirectional signal, averaging these products, and determining bearing by taking the arctangent of the ratio of these average products.

Correct bearing measurement occurs only if the ocean background noise is isotropic, resulting in uncorrelated noise outputs on the three hydrophone channels. Often, however, the presence of nearby shipping or other effects causes the noise field to be directional and this tends to pull all indicated bearings toward the direction of the noise source. Of course, the presence of the nearby noise source increases the total noise seen by the sonobuoy and degrades the detectability of all other targets.

The three outputs of the DIFAR sonobuoy can be combined in such a way as to form a cardioid pattern, with a deep null in one direction. This approach has been used to reduce the noise from a single localized source for detection purposes, and has been proposed as a substitute for the omni signal in DIFAR processing. Unfortunately, this pure cardioid can produce new bearing bias in the opposite direction, so it is not a completely satisfactory solution.

SUMMARY OF THE INVENTION

Accordingly, there is provided an automatic DIFAR cardioid former for producing a composite signal $f_c(t) = f_o(t) + a_1 f_1(t) + a_2 f_2(t)$ to substitute for the omnidirectional signal $f_o(t)$ as a reference. Two feedback loops provide the gains $a_1$ and $a_2$ by integrating the cross correlation of each directional channel with the reference signal.

It is therefore an object of the present invention to provide a method for automatically forming a generalized cardioid pattern.

Another object of the present invention is to provide a sonobuoy system not having bearing bias and having a minimum noise signal channel for detection.

Yet another object of the present invention is to provide a sonobuoy detection system which provides a null or minimum in the direction of strong interfering sources.

A still further object of the present invention is to provide a substitute signal for the omnidirectional signal to remove bearing bias.

BRIEF DESCRIPTION OF THE DRAWINGS

These and other objects and advantages of the present invention will become apparent from the following description of the illustrative embodiment of the invention taken in conjunction with the accompanying drawings in which.

DESCRIPTION OF THE PREFERRED EMBODIMENT

With the omnidirectional channel output designated $f_o(t)$ and the two directional channel outputs designated $f_1(t)$ and $f_2(t)$, consider a composite signal $f_c(t)$ of the form $$f_c(t) = f_o(t) + a_1 f_1(t) + a_2 f_2(t) \tag{1}$$

where $a_1$ and $a_2$ are constants.

This gives a generalized cardioid pattern, with a pure cardioid pattern occurring when $a_1^2 + a_2^2 = 1$. Supposing $a_1$ and $a_2$ are selected to minimize the noise output of $f_c(t)$. This is not necessarily the same as maximizing the signal-to-noise ratio for any particular target because the signal sensitivity of $f_c(t)$ varies with target direction. However, it does so in a median sense since the signal to noise ratio for one half of all target directions (those in the forward lobe of the cardioid) is improved by more than the amount of noise reduction, while the other half receive less improvement. The signal to noise ratio in directions near that of the objectionable noise source is actually degraded due to the null in the cardioid.

The mean square value of $f_c(t)$ is given by $$R_{cc} = R_{oo} + a_1^2 R_{11} + a_2^2 R_{22} + 2a_1 R_{o1} + 2a_2 R_{o2} + 2a_1 a_2 R_{12} \tag{2}$$

where $R_{ij}$ is the mean product (or cross-correlation) between $f_i(t)$ and $f_j(t)$, differentiating equation (2) with respect to $a_1$ and $a_2$, and setting the derivatives equal to zero gives $$2a_1 R_{11} + 2a_2 R_{12} + 2R_{o1} = 0 \tag{3}$$

$$2a_2 R_{12} + 2a_2 R_{22} + 2R_{o2} = 0 \tag{4}$$

Solving simultaneous equations (3) and (4) for $a_1$ and $a_2$, $$a_1 = \frac{-R_{o1} R_{22} + R_{o2} R_{12}}{R_{11} R_{22} - R_{12}^2} \tag{5}$$

$$a_2 = \frac{-R_{o2} R_{11} + R_{o1} R_{12}}{R_{11} R_{22} - R_{12}^2} \tag{6}$$

as the optimum values of $a_1$ and $a_2$ for minimum noise.

Substituting equations (5) and (6) into equation (2), the optimum noise is $$R_{ccopt} = R_{oo} + \frac{-R_{o1}^2 R_{22} + 2R_{o1} R_{o2} R_{12} - R_{o2}^2 R_{11}}{R_{11} R_{22} - R_{12}^2} \tag{7}$$

The cross-correlation between the composite output and each of the two directional signals may be written $$R_{1c} = R_{o1} + a_1 R_{11} + a_2 R_{12} \tag{8}$$

$$R_{2c} = R_{o2} + a_1 R_{12} + a_2 R_{22} \tag{9}$$

Since equation (8) and (9) are identical to equations (3) and (4) of the derivatives of equation (2) above, these cross correlations are zero when the conditions for minimum noise are met. It is therefore seen that the same composite signal which produces minimum noise can remove bearing bias in a detection system if it is used in place of the omnidirectional signal as a reference. It is also seen that a circuit may be constructed to take advantage of the zero-correlation property to adjust the values of $a_1$ and $a_2$ automatically.

Figure 1:
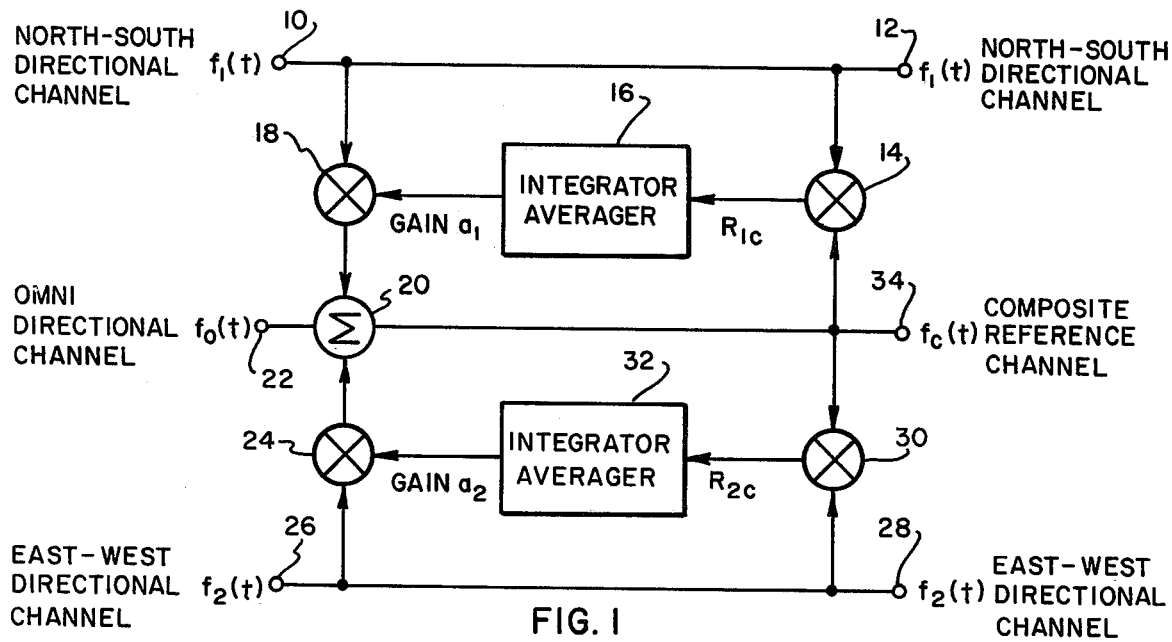
FIG. 1 illustrates in block diagram form an embodiment of the invention.

Referring now to FIG. 1, the north-south direction signal at input terminal 10 is provided to terminal 12 as well as to multiplier 14 which has as its other input composite signal $f_c(t)$. Multiplier 14 provides the multiplied signal $f_1(t)f_c(t)$ to an integrator averager 16 which provides the integrated d.c. value of the multiplied signal, to multiplier 18 which has as its other input signal $f_1(t)$ from terminal 10. In order for the output of Intergrator Averager 16 to be constant, its average input must be zero. This can only occur when the Integrator Averager 16 output reaches the desired value $a_1$, so that $f_c(t)$ has zero correlation with $f_1(t)$. The output from multiplier 18, $a_1 f_1(t)$ is applied to summer 20 whose other inputs are the omnidirectional signal at terminal 22, $f_o(t)$, and the multiplied east-west directional signal $f_2(t)$, from multiplier 24. East-west directional signal $f_2(t)$, at terminal 26 is applied to terminal 28 and multiplier 30 as well as to multiplier 24. Multiplier 30 has as its other input signal $f_c(t)$ from summer 20 and provides its output signal $f_c(t)f_2(t)$ to integrator averager 32. Integrator averager 32 provides the integrated d.c. value of the multiplied signal, which is $a_2$, to multiplier 24 which provides the desired $a_2 f_2(t)$ signal to summer 20. Thus, the output composite signal $f_c(t)$ at terminal 34 from summer 20 is the desired $f_o(t) + a_1 f_1(t) + a_2 f_2(t)$.

Multipliers 14 and 30 between the composite output and the directional signals estimate the cross-correlation, and the integral of the averaged correlation is used to control the gain coefficient to drive the correlations to zero. The correlation measurement $R_{1c}$ controls $a_1$, while the $R_{2c}$ measurement controls $a_2$.

As is evident, all the elements employed in FIG. 1 are conventional in nature and may employ standard operational amplifiers and analog mutipliers. The derivation above uses only the cross-correlation between the hydrophone outputs resulting from the noise field and does not depend on the assumption of a single noise source. In the case of a single localized noise source, the result is a cardioid with a minimum response in the direction of the null and a depth which is the optimum compromise between reducing the localized noise and not unduly accentuating the isotropic background. If multiple noise sources are present a cardioid is still formed with a null somewhere between the noise sources and a depth which again minimizes the resulting noise and provides uncorrelated outputs. The deviation and the resulting automatic cardioid former also ignore the presence of the desired signal and its possible effect on the assumption that the signal is sufficiently weak relative to the total noise that its effect may be ignored.

The performance characteristics of the automatic cardioid former can be studied by considering a situation in which the background noise consists of a nondirectional (in azimuth) noise of power N plus a localized noise source of power L. If the nondirectional noise is concentrated near the horizontal axis, the noise power seen by each directional hydrophone may be shown to be N/2. It can be assumed, without loss of generality, that the localized source is aligned with one of the directional hydrophones (this is always possible through a coordinate rotation) so that the noise correlation matrix becomes $$\begin{bmatrix} R_{oo} & R_{o1} & R_{o2} \\ R_{1o} & R_{11} & R_{12} \\ R_{20} & R_{21} & R_{22} \end{bmatrix} = \begin{bmatrix} N+L & L & 0 \\ L & N/2+L & 0 \\ 0 & 0 & N/2 \end{bmatrix}$$

From this matrix and the preceding sections it is noted that the noise power on the omni signal is $N+L$, the optimum coefficients $a_1$ and $a_2$ are $$a_1 = (-L(N/2) + 0)/((N/2 + L)(N/2) - 0) = 2L/(N + 2L)$$

$$a_2 = (-0 + 0)/((N/2 + L)(N/2) - 0) = 0$$

and the noise power on the composite output with these optimum coefficients is $$R_{ccopt} = N + L + (-L^2(N/2) + 0 - 0)/(N/2 + L)(N/2) - 0) \\ = N(N + 3L)/(N + 2L)$$

These results can be visualized in two ways, by the shape of the resulting cardioid pattern and by the degree of noise reduction obtained. The maximum gain in the front lobe of the cardioid pattern is $1 - a_1$ and the minimum gain in the null of the pattern is $1 + a_1$, while the gain to the side is unity. A front-to-side ratio (FSR) and a back-to-side ratio (BSR) for the cardioid can be defined in decibels as $$FSR = \\ 20 \log(1 - a_1) = 20 \log(1 + \frac{2L}{N + 2L}) = 20 \log \frac{(N + 4L)}{(N + 2L)}$$
$$BSR = \\ 20 \log(1 + a_1) = 20 \log(1 - \frac{2L}{N + 2L}) = 20 \log \frac{N}{(N + 2L)}$$

Figure 2:
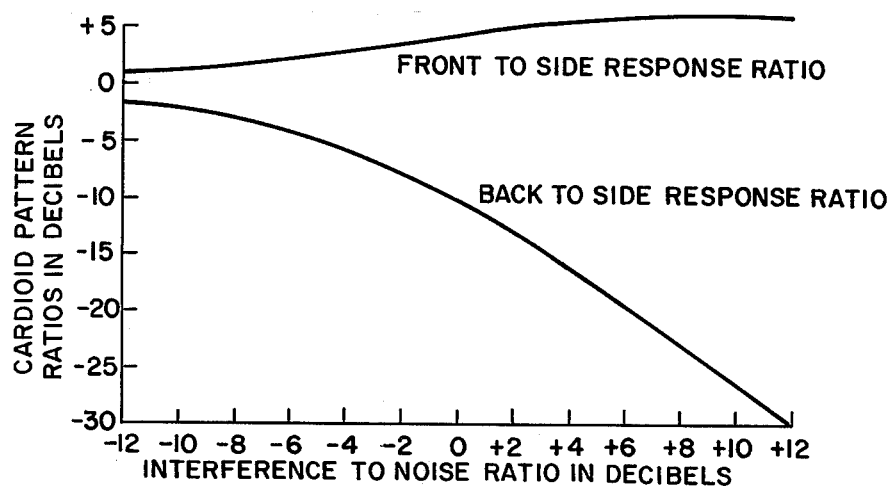
FIG. 2 illustrates in graph form cardioid pattern parameters for discrete interference sources.

These two characteristics of the cardioid pattern are plotted in FIG. 2 as functions of the interference to noise ratio, (INR) defined in decibels as $$INR = 10 \log (L/N)$$

The front-to-back ratio of the pattern can also be inferred from FIG. 2 as the difference between the two curves.

Figure 3:
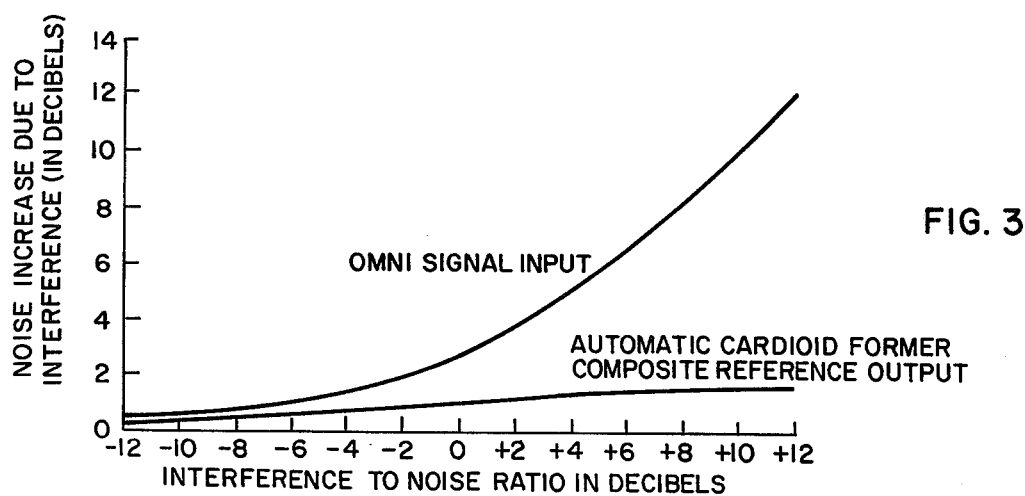
FIG. 3 illustrates in graph form the suppression of discrete interference by the automatic cardioid former according to the invention; and, FIGS. 4(a) and 4(b) illustrate the equivalent circuit of the automatic cardioid former feedback system.

FIG. 3 shows the effect of the automatic cardioid former on the reference signal noise output, relative to that due to the nondirectional noise alone. The upper curve is $10 \log ((N+L)/N)$ which represents the increase in omni channel noise due to the localized interference. The lower curve is $10 \log ((N+3L)/(N+2L))$ which is the noise of the optimum output relative to the nondirectional noise alone. The difference between these curves is the improvement due to the automatic cardioid former. This improvement is seen to be substantial whenever the interference power exceeds that of the non-directional background noise.

Figure 4A:
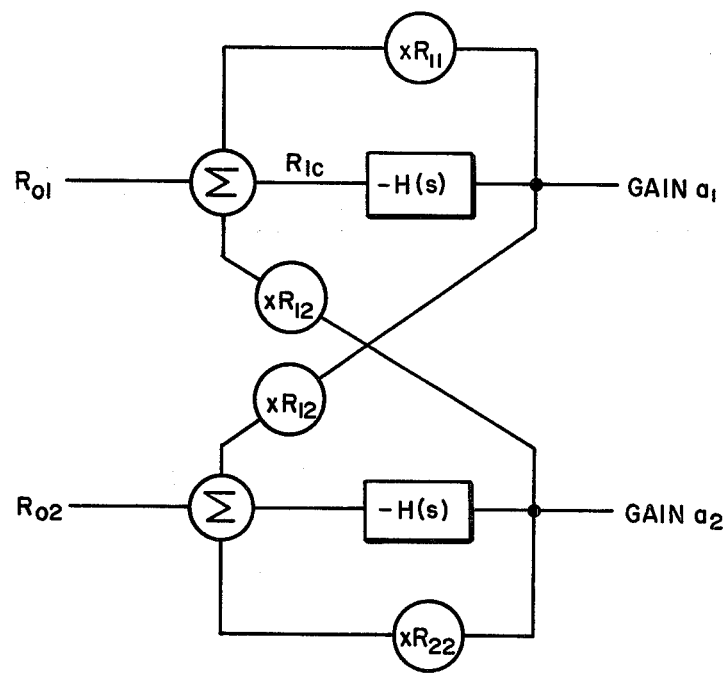
Figure 4B:
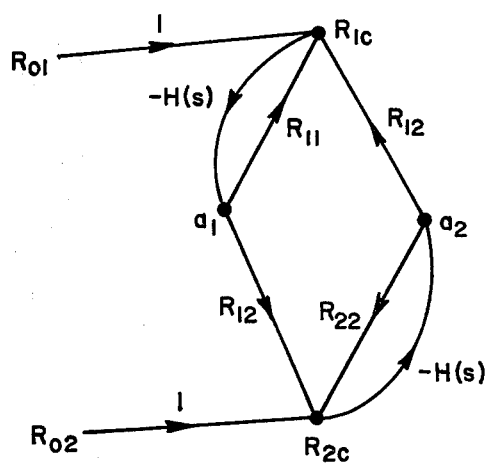

The automatic cardioid former shown in FIG. 1 is a feedback control system since the output cross-correlations are used to adjust $a_1$ and $a_2$ which in turn determine these correlations. Using the previously derived equations for the output cross-correlations and assuming a transfer function of the form $-H(s)$ between each correlation output and the gain coefficient it controls, the equivalent feedback circuit can be drawn as shown in FIG. 4(a). The corresponding signal flow graph is shown in FIG. 4(b). Analysis of this flow graph shows that the output cross-correlations under closed loop conditions may be written $$R_{1c} = \frac{R_{o1}(1 + R_{22}H(s)) - R_{o2}R_{12}H(s)}{1 + (R_{11} + R_{22})H(s) + (R_{11}R_{22} - R_{12}^2)H^2(s)}$$

$$R_{2c} = \frac{R_{o2}(1 + R_{11}H(s)) - R_{o1}R_{12}H(s)}{1 + (R_{11} + R_{12})H(s) + (R_{11}R_{22} - R_{12}^2)H^2(s)}$$

The pole locations for the closed loop systems may be found from the roots of the denominator. This quadratic is $H(s)$ is zero whenever $H(s)$ is equal to $$H(s) = \frac{-(R_{11} + R_{22}) \pm \sqrt{(R_{11} - R_{22})^2 + 4R_{12}^2}}{2(R_{11}R_{22} - R_{12}^2)}$$

Both of these roots are real and negative. Thus stability is assured as long as an $H(s)$ is chosen that does not take on negative real values anywhere in the right half plane.

In order for the steady state values of $R_{1c}$ and $R_{2c}$ to be identically zero for non-zero $R_{o1}$ or $R_{o2}$, $H(s)$ must approach infinity as s approaches 0. Thus the simplest suitable function for $H(s)$ is a pure integrator or $H(s) = K/s$. For this case the closed-loop pole locations become $$s = -(K/2)$$
$$(R_{11} + R_{22}) \pm (K/2)\sqrt{(R_{11} - R_{22})^2 + 4R_{12}^2}$$

These poles are real and negative. For the isotropic noise case where $R_{11} = R_{22}$ and all cross-correlations vanish, both poles appear at $s = -KR_{11}$. (Actually one pole is canceled by the numerator, and the two loops behave as uncoupled first order systems.) For the general noise case the poles separate along the negative real axis and both poles appear in both subsystem responses.

The next more sophisticated transfer function likely to be used for $H(s)$ consists of the integrator plus a simple low pass filter or $H(s) = K/s \, (\tau s + 1)$. Using this function to solve for the pole positions gives $$s = \tfrac{1}{2}\tau \pm$$
$$(\tfrac{1}{2}\tau)\sqrt{1 - 2\tau K(R_{11} + R_{22}) \pm 2\tau K \sqrt{(R_{11} - R_{22})^2 + 4R_{12}^2}}$$

These four poles are coincident at $-\tfrac{1}{2}\tau$ if the noise is isotropic and if $\tau = 1/KR_{11}$. If $\tau$ varies from this value or if the noise is non-isotropic, the poles either separate along the real axis or split off in complex pairs with a real part of $-\tfrac{1}{2}\tau$.

The discussion so far has treated the interfering noise problem as though it was not frequency dependent. If this technique is applied over a limited portion of the spectrum, as on the output of a vernier translator or within a single octave, the assumption of frequency independence is probably adequate. However, over the total DIFAR frequency range the directional noise problem is almost certain to vary with frequency, and some means must be found to account for it. The simplest possibility might be to limit the cardioid formation to the frequencies below about 200 Hz where shipping noise dominates and assumes the noise is isotropic above this frequency. A more general case would be to divide the total frequency range into several bands and perform the automatic cardioid formation independently in each band, employing filters implemented as symmetrical transversal filters with corresponding pure delays in unfiltered signals. This effectively provides zero phase shift filters and is probably the more satisfactory approach for a multi-band system. A simplier approach, if only a few bands are used, is to use RC feedback filters for the bandpass filters but to compensate for these as necessary with all-pass phase shift filters in the remaining signal paths.

It can therefore be seen that the automatic cardioid former described here can provide a substantial improvement in the performance of a DIFAR system in a directional noise environment. Improvements in both detection signal-to-noise ratio and bearing measurement accuracy are provided, and the automatic nature of the system eliminates the need for operator action as in manually steered cardioid systems. Because the system operates over a finite frequency band, perfect removal of bearing bias does not occur when the noise is frequency dependent. Thus, additional bearing bias correction measures are still desirable at the DIFAR post-processing stage.

The invention is not limited to the embodiments described above, but all changes and modifications thereof not constituting departures from the spirit and scope of the invention are intended to be covered by the following claims.

What is claimed as new and desired to be secured by Letters Patent of the United States is:

1. An automatic cardioid former comprising:
    a signal source;
    a first hydrophone for detecting directional signal $f_1(t)$ of said signal source;
    a second hydrophone for detecting directional signal $f_2(t)$ of said signal source, said $f_2(t)$ signal perpendicular to $f_1(t)$;
    a third hydrophone for detecting omnidirectional signal $f_0(t)$ of said signal source;
    means for summing $f_0(t)$ with signal $a_1 f_1(t)$ and $a_2 f_2(t)$ to provide a signal $f_c(t)$, wherein $a_1$ and $a_2$ are gain constants;
    means for multiplying $f_1(t)$ with $f_c(t)$ to provide a first multiplied signal;
    means for integrating the average of said first multiplied signal to provide a gain $a_1$;
    means for multiplying said gain $a_1$ with directional signal $f_1(t)$ to provide said $a_1 f_1(t)$ signal;
    means for multiplying $f_2(t)$ with $f_c(t)$ to provide a second multiplied signal;
    means for integrating the average of said second multiplied signal to provide a gain $a_2$; and
    means for multiplying said gain $a_2$ with directional signal $f_2(t)$ to provide said $a_2 f_2(t)$ signal.

2. A cardioid former as recited in claim 1 wherein said gain $a_1$ is constant when $f_c(t)$ has zero correlation with $f_1(t)$ and said gain $a_2$ is constant when $f_c(t)$ has zero correlation with $f_2(t)$.

* * * * *